United States Patent
Vansa (10) Patent No.: US 10,496,618 B2
(45) Date of Patent: Dec. 3, 2019

(54) MANAGING DATA REPLICATION IN A DATA GRID

(71) Applicant: Red Hat, Inc., Raleigh, NC (US)

(72) Inventor: Radim Vansa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 343 days.

(21) Appl. No.: 15/426,140

(22) Filed: Feb. 7, 2017

(65) Prior Publication Data

US 2018/0225051 A1  Aug. 9, 2018

(51) Int. Cl.
| | |
|---|---|
| *G06F 16/21* | (2019.01) |
| *G06F 3/06* | (2006.01) |
| *G06F 16/28* | (2019.01) |
| *G06F 16/27* | (2019.01) |

(52) U.S. Cl.
CPC ........... *G06F 16/219* (2019.01); *G06F 3/065* (2013.01); *G06F 3/067* (2013.01); *G06F 3/0611* (2013.01); *G06F 16/273* (2019.01); *G06F 16/275* (2019.01); *G06F 16/289* (2019.01)

(58) Field of Classification Search
CPC .... G06F 16/219; G06F 16/273; G06F 16/275; G06F 16/289
See application file for complete search history.

(56) References Cited

U.S. PATENT DOCUMENTS

| | | | |
|---|---|---|---|
| 8,805,984 B2 | 8/2014 | Markus et al. | |
| 9,424,147 B2 | 8/2016 | Raja et al. | |
| 9,429,677 B2 | 8/2016 | AlShaikh et al. | |
| 9,477,743 B2 | 10/2016 | Smith | |
| 2010/0010967 A1* | 1/2010 | Muller | G06F 16/28 707/E17.014 |
| 2011/0184913 A1* | 7/2011 | Hayden | G06F 11/2097 707/652 |
| 2012/0197994 A1 | 8/2012 | Beerbower et al. | |
| 2015/0117274 A1 | 4/2015 | Lu et al. | |

(Continued)

OTHER PUBLICATIONS

Antoniu, G. et al., How to Bring Together Fault Tolerance and Data Consistency to Enable Grid Data Sharing, Jan. 2015, National Institute for Computer and Automatic Research, https://hal.archives-ouvertes.fr/file/index/docid/70540/filename/RR-5467.pdf.

(Continued)

*Primary Examiner* — William Spieler
(74) *Attorney, Agent, or Firm* — Kilpatrick Townsend & Stockton LLP (57) ABSTRACT

Data replication in a data grid can be managed. For example, a computing device usable in the data grid can determine a version number for a key-value pair. The computing device can determine the version number by increasing a counter corresponding to the key-value pair to a new value and using the new value as the version number for the key-value pair. The computing device can store the key-value pair and the version number for the key-value pair in a memory device that is included in the computing device. The computing device can then transmit an electronic communication to a remote computing device that is located remotely from the computing device in the data grid. The electronic communication can cause the remote computing device to store the key-value pair and the version number for the key-value pair in another memory device that is included in the remote computing device.

21 Claims, 4 Drawing Sheets

(56) References Cited

U.S. PATENT DOCUMENTS

| | | |
|---|---|---|
| 2016/0092483 A1 | 3/2016 | Raja et al. |
| 2016/0092540 A1 | 3/2016 | Bihani et al. |
| 2016/0154847 A1 | 6/2016 | Prasanna Kumar et al. |
| 2018/0181604 A1* | 6/2018 | Marohn .................... G06F 3/06 |

OTHER PUBLICATIONS

In-Memory Data Grid, 2015, http://ignite.apache.org/features/datacrid.html.
Hazelcast Documentation, Feb. 4, 2016, http://docs.hazelcast.org/docs/3.5/manual/html-single/.
U.S. Appl. No. 15/298,119, filed Oct. 19, 2016, Pabon et al.
U.S. Appl. No. 15/379,738, filed Dec. 15, 2016, Chen et al.

\* cited by examiner

MANAGING DATA REPLICATION IN A DATA GRID

TECHNICAL FIELD

The present disclosure relates generally to storage accessing and control. More specifically, but not by way of limitation, this disclosure relates to managing data replication in a data grid.

BACKGROUND

A data grid is a data management system that includes multiple nodes in communication with one another via a network (e.g., the Internet) for collectively managing and processing information. Examples of a node can include a computing device, a server, a virtual machine, or any combination of these. Because data grids can include a large number of geographically distributed nodes working together, data grids can experience a wide variety of problems that affect the performance of the data grid as a whole. Some of these problems are faults. One example of a fault can be the failure of a node's hard drive, which may cause the node to shut down or otherwise be unable to access data stored on the hard drive. A data grid can include safety features that provide a "fault tolerance" so that the data grid can continue to operate in the event of a fault, which can provide more reliable service than data grids that are not fault tolerant.

One technique for providing fault tolerance in a data grid is replication. Replication includes creating and storing multiple copies ("replica") of data on different nodes in a data grid. This can help ensure that if one of the nodes storing the data experiences a fault, a copy of the data is still accessible by the data grid via another node, enabling the data grid to continue to operate.

DETAILED DESCRIPTION

There can be disadvantages to replicating data in a data grid. One disadvantage is the increased latency experienced by the data grid as a result of copying the data to multiple nodes. For example, an originator node may determine that specific data is to be stored on two backup nodes—a first backup node and a second backup node—in the data grid to provide fault tolerance. An originator node can be a node that determines that specific data is to be stored in the data grid. A backup node can be a predesignated node in the data grid for storing backup copies of specific types or subsets of data. In this example, the first backup node and the second backup node are predesignated nodes for storing the specific data generated by the originator node. The originator node can communicate the data to the first backup node, which can store the data and communicate a success message back to the originator node indicating that the data was successfully stored. The originator node can also communicate the data to the second backup node, which can store the data and communicate a success message back to the originator node indicating that the data was successfully stored. But this process requires four communications to store the data on the two backup nodes. And each communication increases the latency of the data grid. For example, valuable computing resources (e.g., processing power and memory) are diverted to create and process each communication, which increases the latency of the data grid. And the time taken for each communication to propagate through the network also increases the latency of the data grid. This level of latency may be unsuitable for certain users, processes, or applications. The above process also requires the data grid to have two predesignated backup nodes for the specific data generated by the originator, which may also be unsuitable for certain users, processes, or applications.

Some examples of the present disclosure may overcome one or more of the abovementioned issues by enabling data to be replicated in a data grid using a reduced number of communications between the nodes. The reduced number of communications can result in reduced latency for the data grid. For example, an originator node can transmit a write command for data to a backup node that has been predesignated for storing the data. In response to the write command, the backup node can store the data in memory. The backup node can then transmit a success message that includes the version number back to the originator node. In response to the success message, the originator node can store a local copy of the data in memory. As a result of this process, the two copies of the data are stored in the data grid using only two communications, causing half the latency of the above example that required four communications. This process also only uses one predesignated backup node, rather than two predesignated backup nodes, for storing a copy of the data.

In some examples, the data grid can manage different values for a key (e.g., in a key-value pair) that are stored on various nodes. For example, multiple originator nodes in the data grid can determine different values for the key at different times. Each originator node can attempt to store a respective copy of its respective value for the key on the backup node. The backup node can determine respective version numbers for all of the respective values for the key. The backup node can then use the version numbers to store the respective values of the key in the correct order.

Managing the different values for the key using version numbers can help the data grid recover in the event of a fault. For example, a backup node for a key can experience a fault. In response to the fault, the data grid can select a new backup node for the key. The new backup node can then query all of the nodes in the data grid to determine which node has the most current value for the key. Thereafter, the backup node can obtain and store the most current value for the key. This can result in the data grid again having two copies of the most current version of the key-value pair.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
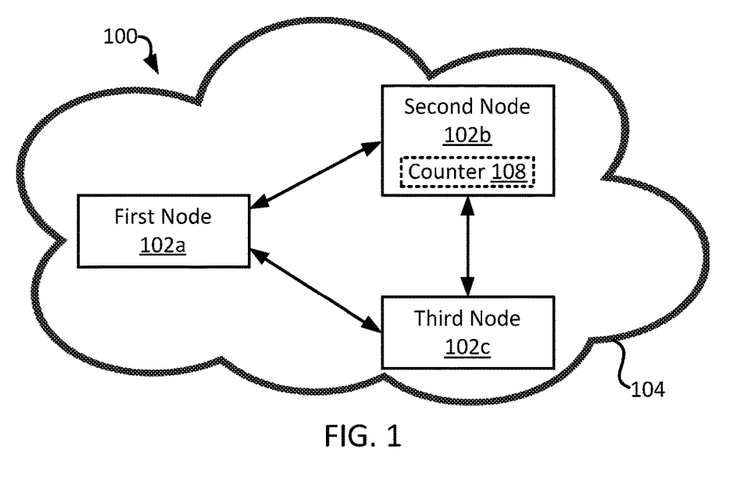
FIG. 1 is a block diagram of an example of a system for managing data replication in a data grid according to some aspects.

FIG. 1 is a block diagram of an example of a system 100 for managing data replication in a data grid 104 according to some aspects. The data grid 104 includes a first node 102a, which can be an originator node. For example, the first node 102a may be executing a data-processing application and determine that information generated via the data-processing application is to be stored in the data grid 104. After determining that the information is to be stored in the data grid 104, the first node 102a can store a local copy of the information (e.g., in a local memory device of the first node 102a). The first node 102a can also transmit a write command to a second node 102b, which can be a backup node. The write command can cause the second node 102b to store a copy of the information. After storing a copy of the information, the second node 102b can respond to the first node 102a with a success message. This process uses only two communications to store two copies of the information in the data grid 104, providing for reduced latency as compared to other data-replication schemes.

One example of information that can be stored in the data grid 104 is a key-value pair. A key-value pair can include a key and a value associated with the key. The key is a unique identifier for data. The value can include the data or a reference to a location of the data. One example of a key-value pair includes a key of "companyName" and an associated value of "Red Hat." Another example of a key-value pair includes a key of "companyName" and an associated value of "http://www.site.com/getName.php," which can be a reference to a website from which the company name can be retrieved. A key-value pair can be one type of identifier-payload pair (e.g., in which the identifier is a unique identifier for the payload data), and other examples can use other types of identifier-payload pairs.

In some examples, different nodes in the data grid 104 can serve as backup nodes for storing different kinds of information. For example, the data grid 104 may include a data structure (e.g., a database, lookup table, log, etc.) indicating that key-value pairs with keys starting with the letter "A" are to be replicated on the second node 102b. The data structure can indicate that key-value pairs with keys starting with the letter "B" are to be replicated on another node, such as a third node 102c. In some examples, the first node 102a can also serve as a backup node, for example, for key-value pairs with keys starting with the letter "C". The first node 102a can determine that the information to be stored has a key starting with the letter "A" and, using the data structure, determine that a backup copy of the key-value pair is to be stored on the second node 102b. In other examples, the first node 102a can determine which node to use as the backup node based on other characteristics (e.g., the type, length, content, hash value, or any combination of these) of the information.

Although the data grid 104 of FIG. 1 is shown as including three nodes 102a-c for simplicity, the data grid 104 can include dozens or hundreds of nodes. And some or all of the nodes in the data grid 104 can be originator nodes and backup nodes for one another. For example, nodes 102a-c can collectively be performing a data-processing task. The third node 102c can determine that a key-value pair starting with the letter "C" is to be stored. So, the third node 102c can store a local copy of the key-value pair and also transmit a write command to the first node 102a to cause a backup of the key-value pair to be stored on the first node 102a. In this relationship, the third node 102c is the originator node and the first node 102a is the backup node. Also, while the data-processing task is being performed, the second node 102b can determine that a key-value pair starting with the letter "B" is to be stored. So, the second node 102b can store a local copy of the key-value pair and also transmit a write command to the third node 102c to cause a back-up of the key-value pair to be stored on the third node 102c. In this relationship, the second node 102b is the originator node and the third node 102c is the backup node. Also, while the data-processing task is being performed, the first node 102a can determine that a key-value pair starting with the letter "A" is to be stored. So, the first node 102a can store a local copy of the key-value pair and also transmit a write command to the second node 102b to cause a back-up of the key-value pair to be stored on the second node 102b. In this relationship, the first node 102a is the originator node and the second node 102b is the backup node. Thus, a single node in the data grid 104 can be both an originator node and a backup node depending on the circumstances.

In some examples, the data grid 104 may generate multiple values of a particular piece of information. For example, nodes 102a-c can each generate different values for a given key during a data-processing task. The data grid 104 can manage the different values of the key to ensure that only the most recent value is kept.

For example, the second node 102b can maintain a data structure (e.g., a counter 108, database, log, or any combination of these) indicating a version number for a particular piece of information that is stored on the second node 102b. If the second node 102b receives a newer value for the piece of information from an originator node, such as the first node 102a, the second node 102b can store the newer value for the piece of information. The second node 102b can also increment or update the data structure to indicate a higher version number for the newer value. The second node 102b may then transmit a communication to the originator node indicating that the newer value of the piece of information was successfully stored. The communication can also indicate the version number for the newer value for the piece of information. In response to the communication, the originator node can store the newer value for the piece of information and the version number for the newer value. As a result of this process, the originator node and the second node 102b should have the same and most updated value for the piece of information. In some examples, the originator node or the second node 102b can then transmit communications to other nodes in the data grid 104 to cause those nodes to delete any older values for the piece of information that they have. This may help ensure that only the most recent value for the particular piece of information is kept in the data grid 104.

As a particular example, the data grid 104 may be performing a data-processing task. During the data-processing task, the first node 102a may determine an initial value for a key-value pair and transmit a write command for the key-value pair to the second node 102b, which may be a backup node for the key-value pair. Based on the write command, the second node 102b may increment the counter 108 from zero to one and store the initial value for the key-value pair. The second node 102b may then send a communication back to the first node 102a indicating that a copy of the key-value pair was successfully stored and that a version number for the key-value pair is one. The first node 102a may receive the communication and associate its key-value pair with a version number of one. Thereafter, the third node 102c may determine a newer value for the key-value pair and transmit a write command to the second node 102b. Based on the write command, the second node 102b may increment the counter 108 from one to two. The second node 102b may also execute the write command by inserting the newer value of the key-value pair into memory (e.g., into a database in memory) or overwriting the initial value of the key-value pair with the newer value for the key-value pair in memory. The second node 102b can then send a communication back to the third node 102c indicating that the write command was successfully completed and a version number for the key-value pair is two. The third node 102c may receive the communication and associate its key-value pair with a version number of two.

At the end of the above example, the second node 102b and the third node 102c may have the most recent value for the key-value pair, and the first node 102a may have an outdated value for the key-value pair. To help ensure that only the most recent value for the key-value pair is kept in the data grid 104, the third node 102c can send a communication to some or all of the other nodes in the data grid 104 indicating that the most recent version of the key-value pair is two. In response to the communication, the nodes can check their respective versions of the key-value pair and, if they have older versions of the key-value pair, they can delete their respective values for the key-value pair. For example, in response to the communication, the first node 102a can determine that it has an older version of the key-value pair and delete its respective value for the key-value pair.

Figure 2:
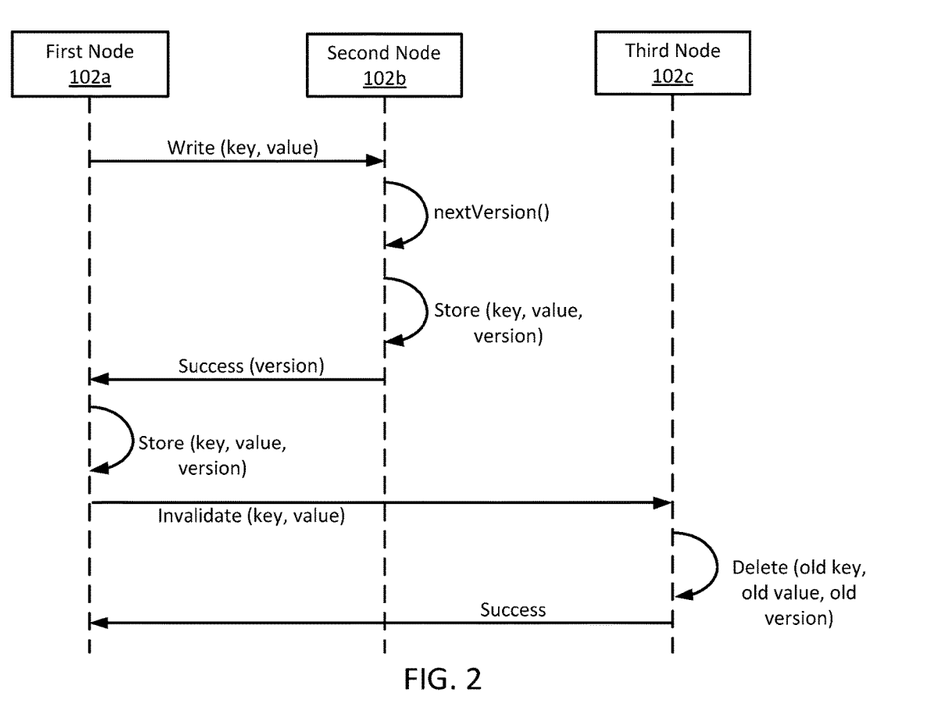
FIG. 2 is a sequence diagram of an example of managing data replication in a data grid according to some aspects.

One example of a version-management process in which a backup node maintains the version number for a key-value pair is shown in FIG. 2. Other examples can include more, fewer, or different steps than the steps depicted in FIG. 2, or a different order of the steps depicted in FIG. 2. The steps of FIG. 2 are described with reference to components described above with regard to FIG. 1.

As shown in FIG. 2, the first node 102a can transmit a write command for a key-value pair to the second node 102b. The first node 102a can be an originator node and the second node 102b can be a backup node. In response to the write command, the second node 102b can determine a version number for the key-value pair by executing one or more processes or functions, such as a nextVersion( ) function. In some examples, the nextVersion( ) function can access a counter 108, increment a value of the counter 108, and return the updated value of the counter for use as the version number. After determining the version number for the key-value pair, the second node 102b can store the key, value, and version number in memory. For example, the second node 102b can insert the key, value, and version number into a database in memory. The second node 102b can then transmit a success message that includes the version number back to the first node 102a. In response to the success message, the first node 102a can store a copy of the key, value, and the version number.

In some examples, the first node 102a can transmit communications to some or all of the other nodes in the data grid 104, besides the second node 102b, for causing the other nodes to invalidate (e.g., delete) their outdated copies of the key-value pair. These communications can be invalidation communications. The invalidation communication can include the key, value, version number, or any combination of these, and can be transmitted as part of a foreground or background process. As a particular example, the first node 102a can transmit an invalidation communication that includes the key and version number to the third node 102c. The third node 102c can invalidate an outdated value for the key-value pair in response to the invalidation communication. For instance, the third node 102c can compare a version number for the key-value pair provided in the invalidation communication to another version number for the key-value pair stored in memory. If the version number for the key-value pair provided in the invalidation communication is higher, the third node 102c can delete its value(s) for the key-value pair from memory. In some examples, the third node 102c can transmit a success message to the first node 102a indicating that the key-value pair was successfully invalidated.

In other examples, the second node 102b can transmit communications to some or all of the other nodes in the data grid 104, besides the first node 102a, for causing the other nodes to invalidate their outdated copies of the key-value pair. For example, the second node 102b can transmit an invalidation communication to the third node 102c. In response to the invalidation communication, the third node 102c can invalidate an outdated version of the key-value pair and transmit a success message back to the second node 102b.

Figure 3:
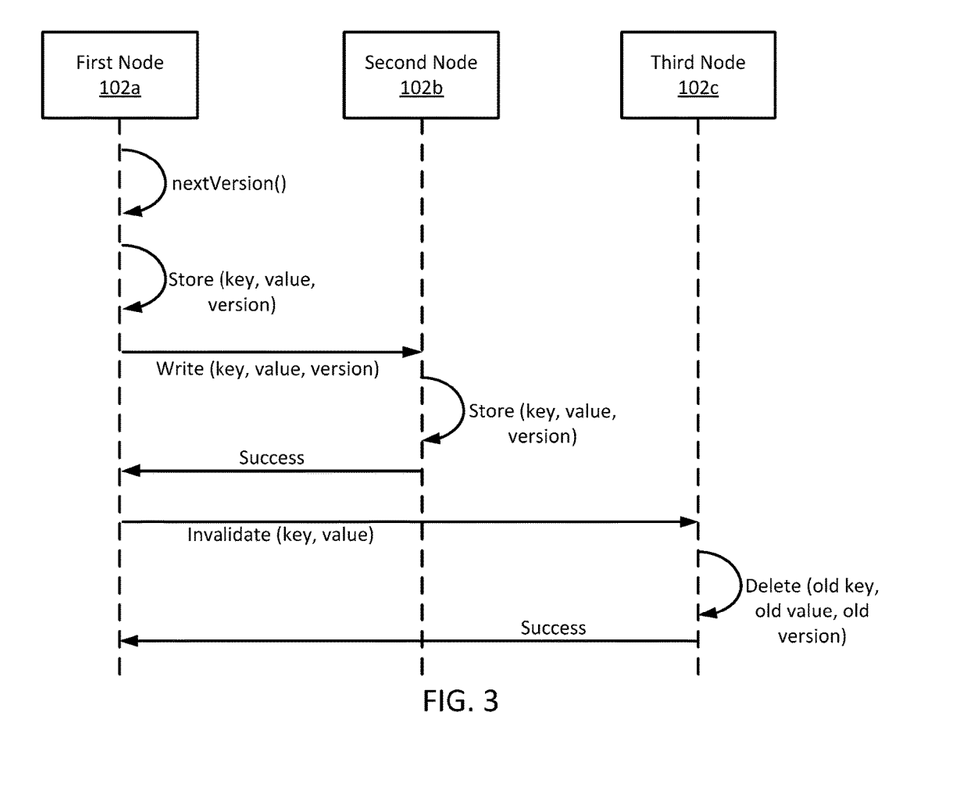
FIG. 3 is a sequence diagram showing another example of managing data replication in a data grid according to some aspects.

Another example of a version-management process in which an originator node maintains the version number for the key-value pair is shown in FIG. 3. Some examples can include more, fewer, or different steps than the steps depicted in FIG. 3, or a different order of the steps depicted in FIG. 3. The steps of FIG. 3 are described with reference to components described above with regard to FIG. 1.

As shown in FIG. 3, the first node 102a can determine a version number for a key-value pair by, for example, executing the nextVersion( ) function. After determining the version number, the first node 102a can store a local copy of the key, value, and version number in memory. The first node 102a can then transmit a write command that includes the version number for a key-value pair to the second node 102b, which can be randomly selected by the first node 102a. The first node 102a can be an originator node and the second node 102b can be a backup node. In response to the write command, the second node 102b can store the key, value, and version number in memory. The second node 102b may then transmit a success message back to the first node 102a.

In some examples, the first node 102a (or the second node 102b) can transmit an invalidation communication to the third node 102c for causing the third node 102c to invalidate its copy of the key-value pair. The third node 102c can invalidate an outdated version of the key-value pair using any of the methods discussed above. And, in some examples, the third node 102c can transmit back a success message indicating that the key-value pair was successfully invalidated.

In some examples, an originator node can determine that a particular piece of information is to be removed from the data grid 104. For example, the first node 102a can determine that a particular key-value pair is to be deleted from the data grid 104. In such an example, the first node 102a can transmit invalidation communications to some or all of the nodes in the data grid 104, except the backup node (e.g., the second node 102b). The first node 102a can then wait until it receives confirmation from those nodes that they have deleted their respective versions of the key-value pair. While the first node 102a is waiting for confirmation, a "tombstone" copy (e.g., a previous version that is to be deleted) of the key-value pair may exist on the first node 102a and the backup node. The tombstone copy of the key-value pair can be useful if a fault occurs during the deletion of the key-value pair from the data grid 104. After receiving confirmation that the nodes have deleted their respective versions of the key-value pair, the first node 102a can transmit a communication (e.g., an invalidation communication or a write command) to the backup node indicating that the key-value pair is to be deleted. In response to the communication, the backup node can delete the key-value pair (and transmit a success message back to the originator node). The originator node can also delete a local copy of the key-value pair, if one is present. As a result of this process, the key-value pair may be removed from all of the nodes in the data grid 104.

Figure 4:
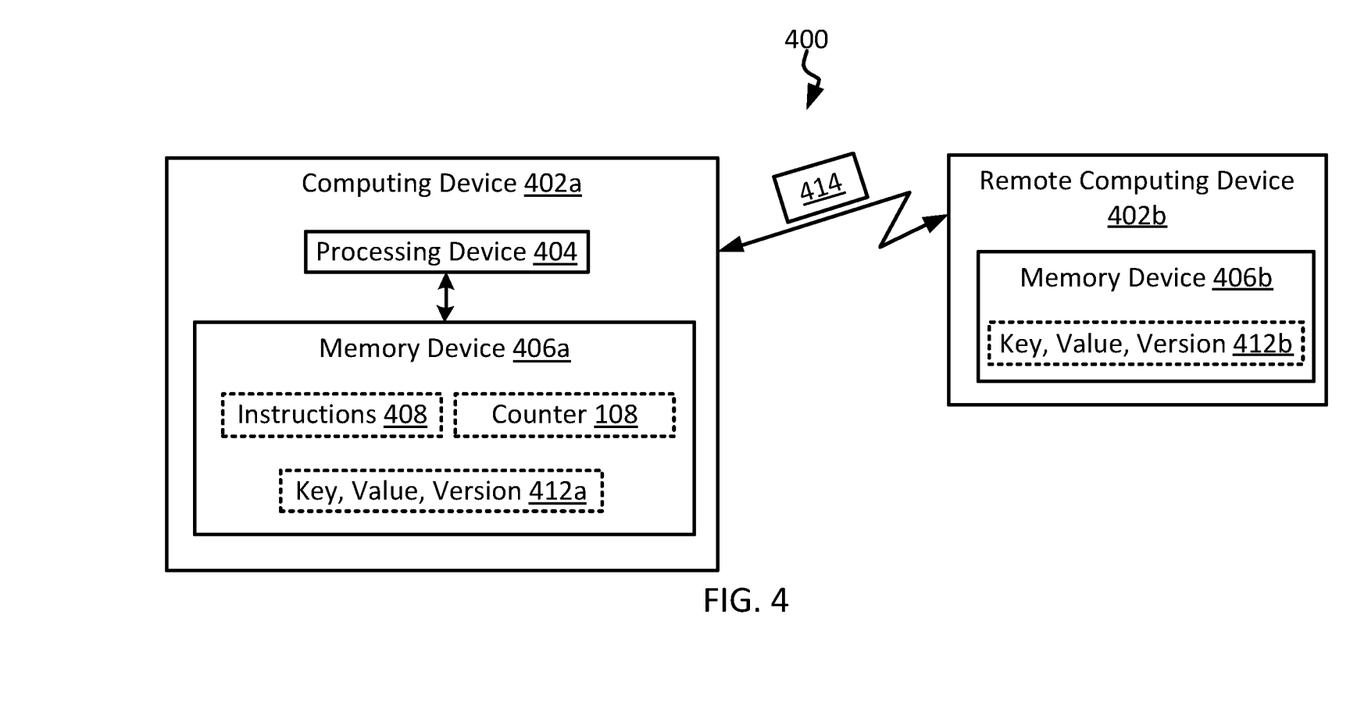
FIG. 4 is a block diagram of another example of a system for managing data replication in a data grid according to some aspects.

Another example of a system 400 for managing data replication in a data grid is shown in FIG. 4. The system 400 includes a computing device 402a having a processing device 404 communicatively coupled to a memory device 406a. The processing device 404 can include one processing device or multiple processing devices. Non-limiting examples of the processing device 404 include a Field-Programmable Gate Array (FPGA), an application-specific integrated circuit (ASIC), a microprocessor, etc.

The processing device 404 can execute one or more operations for managing data replication in a data grid. The processing device 404 can execute instructions 408 stored in the memory device 406a to perform the operations. In some examples, the instructions 408 can include processor-specific instructions generated by a compiler or an interpreter from code written in any suitable computer-programming language, such as C, C++, C#, etc.

Memory device 406a can include one memory device or multiple memory devices. The memory device 406a can be non-volatile and may include any type of memory device that retains stored information when powered off. Non-limiting examples of the memory device 406a include electrically erasable and programmable read-only memory (EEPROM), flash memory, or any other type of non-volatile memory. In some examples, at least some of the memory devices 406a can include a medium from which the processing device 404 can read instructions 408. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The computing device 402a can be in direct or indirect (e.g., via a network) communication with a remote computing device 402b, with the computing devices 402a-b acting as nodes in a data grid. The remote computing device 402b can also have a memory device 406b and a processing device, which can be configured similarly to the abovementioned memory device 406a and processing device 404, respectively.

Figure 5:
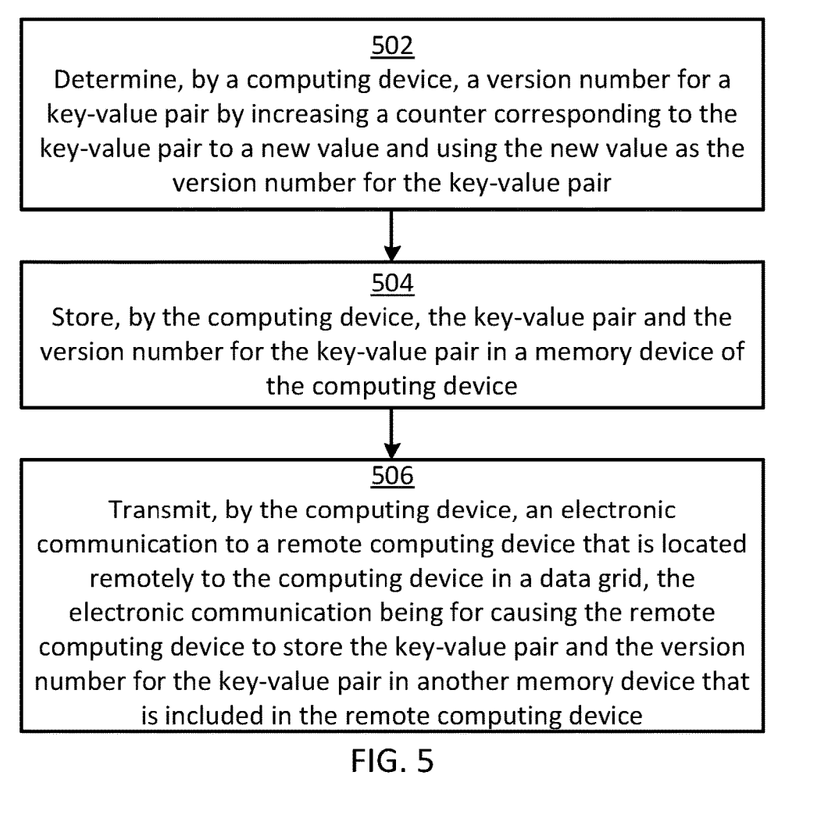
FIG. 5 is a flow chart showing an example of a process for managing data replication in a data grid according to some aspects.

In some examples, the computing devices 402a-b can implement one or more of the processes discussed in the present disclosure. For example, the remote computing device 402b, which can be an originator node, can determine that value for a key is to be stored. The remote computing device 402b can transmit a communication that includes the value for the key to the computing device 402a, which can be a backup node. The computing device 402a can receive the communication. Based on the communication, the computing device 402a perform (e.g., using processing device 404) some or all of the steps of shown FIG. 5. The steps of FIG. 5 are described below with reference to components described above with regard to FIG. 4.

In block 502, the computing device 402a determines a version number for the key-value pair by increasing a counter 108 corresponding to the key-value pair to a new value. The computing device 402a can use the new value as the version number for the key-value pair.

In block 504, the computing device 402a stores the key-value pair and the version number for the key-value pair in a memory device 406a of the computing device 402a. For example, the computing device 402a can insert a new entry into a database stored in memory device 406a for the key, value, and version number. As another example, the computing device 402a can overwrite an old entry for the key-value pair in the database with the new key, new value, and new version number.

In block 506, the computing device 402a transmits an electronic communication 414 to the remote computing device 402b that is located remotely from the computing device 402a in a data grid. The electronic communication can cause the remote computing device 402b to store the key-value pair and the version number for the key-value pair in another memory device 406b that is included in the remote computing device 402b. For example, the computing device 402a can transmit a success message that includes the version number for the key-value pair. The remote computing device 402b can receive the success message and, in response to the success message, store the key-value pair and the version number for the key-value pair in its memory device 406b.

For simplicity, the example discussed above included a single counter 108 corresponding to a single key-value pair. But, in some examples, a single counter 108 may correspond to multiple key-value pairs (e.g., a group of key-value pairs having one or more common characteristics). Additionally or alternatively, computing device 402a can include multiple counters, logs, databases, or other data structures for maintaining version numbers for multiple different pieces of information. For example, the computing device 402a can include five separate counters, with each counter indicating a respective version number for a different key-value pair. In such an example, the computing device 402a can receive, from the remote computing device 402b, a communication indicating that a specific key-value pair is to be stored. The computing device 402a can identify a counter 108 corresponding to the specific key-value pair and increment the counter 108 to determine a version number for the specific key-value pair. The computing device 402a can then store a local copy 412a of the key, value, and version number in the memory device 406a. The computing device 402 can also cause the remote computing device 402b to store a copy 412b of the key, value, and version number in the memory device 406b.

Returning now to FIG. 1, some features of the present disclosure can enable a data grid to recover (e.g., continue operating) after a fault. For example, the data grid 104 may have dozens of nodes, with the second node 102b serving as the backup node for specific information, such as a specific key-value pair. If the second node 102b experiences a fault and becomes inoperable, another node in the data grid 104 may be designated as the new backup node for the specific information. For example, the data grid 104 can select the third node 102c as the new backup node. In some examples, the data grid 104 can select the third node 102c randomly or using a predefined algorithm. The data grid 104 can then update a database, log, or other data structure to indicate that the third node 102c is now the backup node for the specific information.

In some examples, the new backup node can initiate a reconciliation process that includes obtaining and storing the most recent value(s) of the specific information. The reconciliation process can result in the data grid 104 again having two stored copies of the most recent value of the specific information. This can provide additional fault tolerance in case of another fault in the future. For example, the third node 102c can be selected as a new backup node for a particular key. Thereafter, the third node 102c can transmit communications to some or all of the nodes in the data grid 104 requesting that each node respond with its respective version number for its respective value for the key. Each node may then respond with the version number for its version of the key. The third node 102c can then determine that, for example, the first node 102a has the value with the highest version number and request the value from first node 102a. The third node 102c can update a counter to indicate the highest version number for the value. The first node 102a can communicate the value to the third node 102c. The third node 102c can then store the value pair in memory. In some examples, the third node 102c can also transmit invalidation communications to some or all of the other nodes in the data grid 104 that have outdated values for the key-value pair, thereby causing those nodes to delete their outdated values.

In some examples, the new backup node may have the most recent value of the specific information. For example, the third node 102c can be selected as the new backup node for a key-value pair, but the third node 102c can have the most recent value for the key-value pair. The new backup node can determine that it has the most recent value of the specific information by querying some or all of the nodes in the data grid 104 to determine each node's respective version number of the information. In some examples, based on determining that it has the most recent value for the specific information, the new backup node can cause a copy of the most recent value of the specific information to be stored on another node to provide fault tolerance. For example, the third node 102c can determine that it has the most recent value for a key. The third node 102c can then select (e.g., randomly) the first node 102a for use in storing a copy of the value and transmit a write command to the first node 102a, which can store a copy of the value in response to the write command. As a result, the data grid 104 may once again have two copies of the most recent version of the key-value pair stored on separate nodes.

Although the above examples are described with reference to data grids, some examples of the present disclosure can be implemented using any number and combination of distributed computing-environments (e.g., data grids, networks, wide area networks, local area networks, cloud-computing environments, the Internet, etc.). Examples of the present disclosure are not limited to use with data grids.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A computing device comprising:
   a processing device; and
   a memory device on which instructions executable by the processing device are stored for causing the processing device to:
   receive a first electronic communication from a remote computing device that is located remotely from the computing device, the first electronic communication comprising a key-value pair;
   in response to receiving the first electronic communication, determine a version number for the key-value pair by increasing a counter corresponding to the key-value pair to a new value and using the new value as the version number for the key-value pair;
   store the key-value pair and the version number for the key-value pair in the memory device; and
   transmit a second electronic communication to the remote computing device, the second electronic communication being for causing the remote computing device to store the key-value pair and the version number for the key-value pair in another memory device that is accessible to the remote computing device.

2. The computing device of claim 1, wherein the counter corresponds to a plurality of key-value pairs.

3. The computing device of claim 1, wherein the second electronic communication comprises the version number for the key-value pair and indicates that the computing device successfully stored the key-value pair in the memory device.

4. The computing device of claim 1, wherein the first electronic communication comprises a write command.

5. The computing device of claim 1, wherein the key-value pair is a first key-value pair, and wherein the memory device further comprises instructions executable by the processing device to cause the processing device to:
   receive a third electronic communication corresponding to a second key-value pair stored in the memory device;
   based on the third electronic communication, determine that the second key-value pair is an outdated version of the second key-value pair; and
   based on determining that the second key-value pair is the outdated version, delete the second key-value pair from the memory device.

6. The computing device of claim 1, wherein storing the key-value pair and the version number for the key-value pair in the memory device comprises (i) updating an existing entry for the key-value pair in a database or (ii) inserting a new entry for the key-value pair into the database.

7. The computing device of claim 1, wherein the counter is a first counter and the memory device further comprises instructions executable by the processing device to cause the processing device to:
   determine that a particular remote computing device from among a plurality of remote computing devices has a most current version of a particular key-value pair by communicating with each remote computing device of the plurality of remote computing devices;
   request the most current version of the particular key-value pair from the particular remote computing device;
   receive the most current version of the particular key-value pair from the particular remote computing device;
   store the most current version of the particular key-value pair in the memory device; and
   transmit electronic communications to a remainder of the remote computing devices among the plurality of remote computing devices other than the particular remote computing device, the electronic communications being configured to cause the remainder of the remote computing devices to delete their respective versions of the particular key-value pair.

8. A method comprising:
receiving, by a computing device, a first electronic communication from a remote computing device that is located remotely from the computing device, the first electronic communication comprising a key-value pair;
determining, by the computing device and in response to receiving the first electronic communication, a version number for the key-value pair by increasing a counter corresponding to the key-value pair to a new value and using the new value as the version number for the key-value pair;
storing, by the computing device, the key-value pair and the version number for the key-value pair in a memory device of the computing device; and
transmitting, by the computing device, a second electronic communication to the remote computing device, the second electronic communication being for causing the remote computing device to store the key-value pair and the version number for the key-value pair in another memory device that is accessible to the remote computing device.

9. The method of claim 8, wherein the counter corresponds to a plurality of key-value pairs.

10. The method of claim 8, wherein the second electronic communication comprises the version number for the key-value pair and indicates that the computing device successfully stored the key-value pair in the memory device.

11. The method of claim 8, wherein the first electronic communication comprises a write command.

12. The method of claim 8, wherein the key-value pair is a first key-value pair, and further comprising:
receiving a third electronic communication corresponding to a second key-value pair stored in the memory device;
based on the third electronic communication, determining that the second key-value pair is an outdated version of the second key-value pair; and
based on determining that the second key-value pair is the outdated version, deleting the second key-value pair from the memory device.

13. The method of claim 8, wherein storing the key-value pair and the version number for the key-value pair in the memory device comprises (i) updating an existing entry for the key-value pair in a database or (ii) inserting a new entry for the key-value pair into the database.

14. The method of claim 8, further comprising:
determining that a particular remote computing device from among a plurality of remote computing devices has a most current version of a particular key-value pair by communicating with each remote computing device of the plurality of remote computing devices;
requesting the most current version of the particular key-value pair from the particular remote computing device;
receiving the most current version of the particular key-value pair from the particular remote computing device;
storing the most current version of the particular key-value pair in the memory device; and
transmitting electronic communications to a remainder of the remote computing devices among the plurality of remote computing devices other than the particular remote computing device, the electronic communications being configured to cause the remainder of the plurality of remote computing devices to delete their respective versions of the particular key-value pair.

15. A non-transitory computer readable medium comprising program code that is executable by a processing device of a computing device for causing the processing device to:
receive a first electronic communication from a remote computing device that is located remotely from the computing device, the first electronic communication comprising a key-value pair;
in response to receiving the first electronic communication, determine a version number for the key-value pair by increasing a counter corresponding to the key-value pair to a new value and using the new value as the version number for the key-value pair;
store the key-value pair and the version number for the key-value pair in a memory device; and
transmit a second electronic communication to the remote computing device, the second electronic communication being for causing the remote computing device to store the key-value pair and the version number for the key-value pair in another memory device that is accessible to the remote computing device.

16. The non-transitory computer readable medium of claim 15, wherein the second electronic communication comprises the version number for the key-value pair and indicates that the processing device successfully stored the key-value pair in the memory device.

17. The non-transitory computer readable medium of claim 15, wherein the first electronic communication includes a write command for the key-value pair.

18. The non-transitory computer readable medium of claim 15, wherein the key-value pair is a first key-value pair, and further comprising program code that is executable by the processing device for causing the processing device to:
receive a third electronic communication corresponding to a second key-value pair stored in the memory device;
based on the third electronic communication, determine that the second key-value pair is an outdated version of the second key-value pair; and
based on determining that the second key-value pair is the outdated version, delete the second key-value pair from the memory device.

19. The non-transitory computer readable medium of claim 15, wherein storing the key-value pair and the version number for the key-value pair in the memory device comprises (i) updating an existing entry for the key-value pair in a database or (ii) inserting a new entry for the key-value pair into the database.

20. The non-transitory computer readable medium of claim 15, wherein the counter is a first counter, and further comprising program code that is executable by the processing device for causing the processing device to:
determine that a particular remote computing device from among a plurality of remote computing devices has a most current version of a particular key-value pair by communicating with each remote computing device of the plurality of remote computing devices;
request the most current version of the particular key-value pair from the particular remote computing device;
receive the most current version of the particular key-value pair from the particular remote computing device;
store the most current version of the particular key-value pair in the memory device; and
transmit electronic communications to a remainder of the remote computing devices among the plurality of remote computing devices other than the particular remote computing device, the electronic communications being configured to cause the remainder of the remote computing devices to delete their respective versions of the particular key-value pair.

21. A non-transitory computer readable medium comprising program code that is executable by a processing device for causing the processing device to:

determine that a particular remote computing device from among a plurality of remote computing devices has a most current version of a particular key-value pair by communicating with each remote computing device of the plurality of remote computing devices;

request the most current version of the particular key-value pair from the particular remote computing device;

receive the most current version of the particular key-value pair from the particular remote computing device;

store the most current version of the particular key-value pair in a memory device; and transmit electronic communications to a remainder of the remote computing devices among the plurality of remote computing devices other than the particular remote computing device, the electronic communications being configured to cause the remainder of the remote computing devices to delete their respective versions of the particular key-value pair.

* * * * *